United States Patent
Nonni

(10) Patent No.: US 12,505,443 B2
(45) Date of Patent: Dec. 23, 2025

(54) SYSTEM AND METHOD FOR PROVIDING A DECENTRALIZED EXCHANGE FOR CREDIT LENDING

(71) Applicant: DIGITAL FIRST HOLDINGS LLC, Atlanta, GA (US)

(72) Inventor: Bryan Walser Nonni, Atlanta, GA (US)

(73) Assignee: DIGITAL FIRST HOLDINGS LLC, Atlanta, GA (US)

(*) Notice: Subject to any disclaimer, the term of this patent is extended or adjusted under 35 U.S.C. 154(b) by 80 days.

(21) Appl. No.: 18/096,646

(22) Filed: Jan. 13, 2023

(65) Prior Publication Data

US 2024/0242215 A1    Jul. 18, 2024

(51) Int. Cl.
| | |
|---|---|
| G06Q 20/40 | (2012.01) |
| G06Q 20/24 | (2012.01) |
| G06Q 20/36 | (2012.01) |
| G06Q 20/38 | (2012.01) |

(52) U.S. Cl.
CPC ......... *G06Q 20/4014* (2013.01); *G06Q 20/24* (2013.01); *G06Q 20/36* (2013.01); *G06Q 20/382* (2013.01)

(58) Field of Classification Search
CPC .... G06Q 20/4014; G06Q 20/24; G06Q 20/36; G06Q 20/382; G06Q 20/386; G06Q 40/03

See application file for complete search history.

(56) References Cited

U.S. PATENT DOCUMENTS

| | | | |
|---|---|---|---|
| 11,522,858 B2 | 12/2022 | Murdoch et al. | |
| 2013/0018777 A1* | 1/2013 | Klein | G06Q 40/02 705/38 |
| 2017/0169508 A1* | 6/2017 | Song | G06Q 20/223 |

(Continued)

FOREIGN PATENT DOCUMENTS

WO    WO-2019200402 A1 * 10/2019 ............. G06Q 20/02

OTHER PUBLICATIONS

Henry Tsai, Decentralized Web Node, Dec. 2022, https://web.archive.org/web/20221222011117/https:/identity.foundation/decentralized-web-node/spec/ (Year: 2022).*

(Continued)

*Primary Examiner* — Chunling Ding
(74) *Attorney, Agent, or Firm* — Notaro, Michalos & Zaccaria P.C.; John S. Economou

(57) ABSTRACT

A system and method for performing a financial transaction are disclosed. An application running on a first server requests a financial transaction secured by collateral of a first party in the form of digital currency. The application generates a semantic ASK message encoded with parameters defining the requested financial transaction. The semantic ASK message is sent to one or more second parties via a decentralized web node thereof. A BID message is received from at least one of the one or more second parties defining proposed terms for the requested financial transaction. Credentials for the first party are forwarded from a decentralized web node of the first party, the credentials defined in the BID message. Access is provided to the collateral of the first party to the second party upon receipt of confirmation of the financial transaction from the second party.

14 Claims, 5 Drawing Sheets

(56) References Cited

U.S. PATENT DOCUMENTS

| | | | |
|---|---|---|---|
| 2019/0303926 A1* | 10/2019 | Yantis | G06Q 40/03 |
| 2020/0143466 A1* | 5/2020 | Wu | H04L 9/3239 |
| 2020/0211099 A1* | 7/2020 | Smith | H04L 63/126 |
| 2022/0166626 A1* | 5/2022 | Madisetti | H04L 9/50 |
| 2022/0261789 A1* | 8/2022 | Nonni | G06Q 30/0201 |
| 2023/0359944 A1* | 11/2023 | Sheehan | G06Q 30/0201 |
| 2024/0005318 A1* | 1/2024 | Dolezal | G06Q 20/401 |
| 2024/0171406 A1* | 5/2024 | Bercik | H04L 9/3247 |

OTHER PUBLICATIONS

Henry Tasi, Decentralized Web Node, Dec. 2022, https://web.archive.org/web/20221222011117/https:/identity.foundation/decentralized-web-node/spec/ (Year: 2022).*

Anonymous, What Is Web5? Web5 Components Explained, Aug. 2022, https://pixelplex.io/blog/web5-explained/ (Year: 2022).*

* cited by examiner

SYSTEM AND METHOD FOR PROVIDING A DECENTRALIZED EXCHANGE FOR CREDIT LENDING

FIELD

This disclosure relates generally to a system and method for providing a decentralized exchange for credit lending.

BACKGROUND

Enterprises and governments rely heavily on collecting data from their customers and citizens. In fact, private and public information about every individual is almost certainly maintained by a plethora of different entities in a variety of data warehouse located across the globe. This has caused a great deal of problems for individuals and for the enterprises. The personal data and private data of individuals are routinely stolen and used for nefarious purposes with the unwittingly assistance of government bureaucrats and government systems to obtain false government identification cards or government benefits. Consumers are frequently targeted and harassed by businesses based on their spending habits, browser history, and location data.

In the midst of this chaos, governments are finally realizing that data about an individual should belong to the individual and not collected and used by businesses, governments, or organizations. Some countries have adopted more stringent laws and regulations should a consumer be harmed by a data breach at an enterprise that houses some of the consumer's data. Some countries have adopted laws that make clear any retention of consumer data needs to have the express informed consent of the consumer and/or requires payment of a fee to the consumer.

The World Wide Web (Web) is an information system that allows documents and other resources to be accessed over the internet. Under the original Web model, users do not control their own data or identity. Instead, providers of services (for example) over the internet give each user an account (username/password) and all information and data associated with that account is stored by the provider. A new Web model (Web 5) has been proposed which moves the control of user information and data back to the user by decentralizing how information is stored. Under this model, users obtain decentralized identifiers (DIDs) for identification purposes which are not controlled by any provider. In addition, Web 5 provides for verifiable credentials (VCs) that enable trustless interactions. The VCs are cryptographically signed by the issuer and include information from that issuer about the user (e.g., a financial institution can issue a VC which identifies a user's bank account and other desired information related thereto). Web 5 further provides for decentralized web nodes (DWNs). A DWN is a data storage and message relay mechanism entities can use to locate public or private permissioned data related to a given DID. Although blockchain is not a necessary part of Web 5, blockchains offer may advantages for storing DIDs and offer advantages in further improving the level of trust, transparency and the overall efficiencies required for a decentralized system like Web 5. A user's DWN typically serves as a self-sovereign identify storage location (wallet).

The traditional lending process is slow (taking days, weeks, or months) and cumbersome and requires that multiple parties engage in online and offline communications with written and digital documentation in order to acquire a loan or line of credit. Current lending solutions with traditional and non-traditional financial institutions require a borrower to have an account with that financial institution before finalizing the terms of the credit transaction (e.g., a loan or a line of credit). Although some lending aggregator solutions allow a consumer to quickly receive loan information, such solutions require that the consumer provide personal information for marketing and advertising purposes (e.g., email address, phone number, home address). These lending aggregator solutions also redirect the consumer to a financial institution in order to sign up for an account with that financial institutions in order to complete the loan process. As such, these lending aggregator solutions act as centralized gate keepers that provide quotes for loans but do not allow the consumer to interact with a range of financial institutions directly. These lending aggregator solutions force financial institutions to compete directly with one another in a marketplace-type context initially, but then the consumer must engage directly with one or more financial institutions via separate lines of communication in order to acquire the final loan information and finalize terms of the potential loan.

All current lending solutions require that financial institutions make an effort to verify the identity, suitability, and risks involved with maintaining a business relationship with a consumer before providing loan information to a consumer, potentially obtaining information from the consumer that is unnecessary to the loan issuance process. Current financial institution lending services typically require collateral of real assets denominated in fiat currency to acquire a loan. No traditional financial institutions have services offering loans based on digital currency (cryptocurrency) as collateral, and non-traditional financial institutions that do offer these services limit such services to fiat-based loans with cryptocurrency as collateral. Furthermore, these financial institutions require the borrower to grant the financial institution with custody of their assets before being considered for a loan. No solution currently exists that gives a consumer the ability to leverage a multi-signature, escrow wallet for cryptocurrency assets as a means for acquiring a loan or line of credit.

Accordingly, there is a need for a system and method for providing a decentralized exchange for credit lending that overcomes the drawbacks recited above.

BRIEF DESCRIPTION OF THE DRAWINGS

The following detailed description, given by way of example and not intended to limit the present disclosure solely thereto, will best be understood in conjunction with the accompanying drawings in which.

DETAILED DESCRIPTION

In the present disclosure, like reference numbers refer to like elements throughout the drawings, which illustrate various exemplary embodiments of the present disclosure.

The system and method of the present disclosure provides consumers with the ability to submit loan requests (ASKs) for various lending or credit products where the ASK format includes reference to digital currency such as bitcoin or other cryptocurrency assets as collateral. The participating financial institutions (PFIs) receive these ASKs and return acceptance, denial, or a conditional acceptance/counteroffer to the ASK. The system and method of the present disclosure employs Web 5 constructs such as decentralized identifiers (DIDs), DID communication protocols, and self-sovereign identity (SSI) verifiable credentials (VCs). On the consumer side, the use of these constructs allows consumers to on-board and use their VCs to prove their identity when making ASKs to PFIs. On the financial institution side, the use of these constructs allows PFIs to on-board and use their VCs to prove their identity as a business when making bids to other PFIs to sell loans or when replying to consumer ASKs. PFIs can submit a BID for selling loans to other PFIs or a BID offering loan terms to consumers in the system and method of the present disclosure. Consumers can also submit BIDs to sell their loan position to other consumers matching a certain credit profile.

The system and method of the present disclosure may also provide a locking-scripting/multi-signature locking mechanism which provides a consumer with partial self-custody of their collateral. This provides a form of escrow that gives consumers continued custody of their assets but also gives control of the fund movement to the PFI when certain conditions are met (i.e., if an expected payment is not made on-time, the PFI can unlock and access the asset). Depending on the level of custody on the part of the consumer, the loan terms can shift based on the risk to the PFI. The system and method of the present disclosure also provides consumers with the option to use their cryptocurrency (e.g., bitcoin or BTC) as collateral to purchase an equivalent amount of additional cryptocurrency. For example, if a consumer desires a cryptocurrency-backed loan to purchase additional cryptocurrency, the consumer could ASK to buy 0.5 BTC and offer 0.5 BTC as collateral for the loan. The system and method of the present disclosure also provides for a new data model for assessing credit risk using information which is included in the consumer's SSI wallet that is processed to generate a trust score credential as discussed herein.

Figure 1:
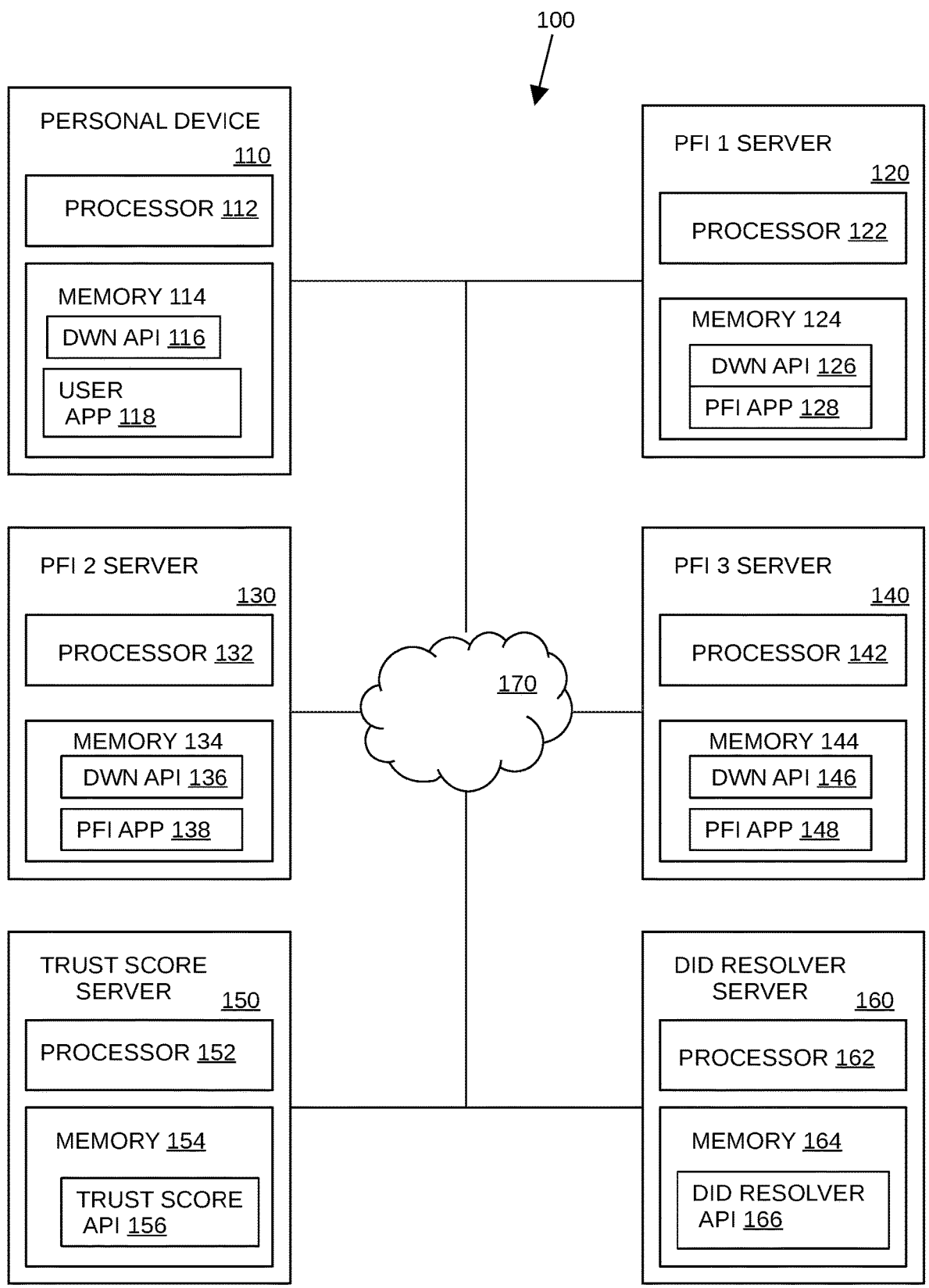
FIG. 1 is a block diagram of a system for providing a decentralized exchange for credit lending according to the present disclosure.

Referring now to FIG. 1, the system 100 may include a personal device 110, a first PFI server 120 for generating a remote decentralized web node, a second PFI server 130 for generating a remote decentralized web node, a third PFI server 140 for generating a remote decentralized web node, an optional trust score server 150 for generating a trust score as discussed below, and a DID resolver server 160, which all are linked via an internet connection 170. The three PFI servers 120, 130, 140 are merely representative of the multiple PFIs that may elect to participate in the system. The system 100 can operate with only one PFI, but can accommodate multiple PFIs. In addition, the personal device 110 is representative of a single consumer making use of the system, but in operation the system 100 is available to any number of consumers that wish to participate in the system.

The personal device 110 may be a mobile device or other type of computing device (e.g., a personal computer or other type of computer server). The personal device 110 includes a processor 112 and a memory 114. The memory 114 is a non-transitory computer-readable storage medium such as hard disk drive used to hold application programs, an operating system, and user data. A decentralized web node (DWN) application programming interface (API) 116 and a user application (app) 118 are stored in the memory 114. The DWN API 116 operates to provide a local DWN that has a secure storage area for user data, accessible via DID-relative addressing. The user's DWN acts as a self-sovereign identity wallet, securely storing user information that can be accessed only when the user provides access thereto. The user app 118 provides a user interface and functionality to manage credentials and app data stored in the DWN, and interfaces with other functionality of the self-sovereign identity wallet. The user app 118 provides the user with an interface used to generate a banking-related transaction request (e.g., an ASK or a BID as discussed herein) pursuant to the system and method of the present disclosure. The user app 118 also provides credential functions, DID functions, DID authentication, and context management. The user app 118 may also provide the user with the ability to request a trust score for lending purposes, as discussed below and to grant access to a subset of data stored in the DWN necessary for determining the trust score.

The three PFI servers 120, 130, 140 each include a processor 122, 132, 142 and a memory 124, 134, 144. The memory 124, 134, 144 is a non-transitory computer-readable storage medium such as hard disk drive used to hold application programs, an operating system, and user data. The DWN API 126, 136, 146 provides a remote DWN that has a secure storage area for data, accessible via DID-relative addressing, under the control of the respective PFI app 128, 138, 148 running on the processor 122, 132, 142 of the associated PFI server 120, 130, 140. The PFI apps 128, 138, 148 provide the respective PFIs to receive and respond to the banking-related transaction requests and to initiate banking-related transaction requests as well.

The trust score server 150 includes a processor 152 and a memory 154. The memory 154 is a non-transitory computer-readable storage medium such as hard disk drive used to hold application programs, an operating system, and user data. A trust score API 156 is stored in memory 154. The trust score API 156 operates as shown in the flowchart 400 in FIG. 3 and discussed below.

The DID resolver server 160 includes a processor 162 and a memory 164. The memory 164 is a non-transitory computer-readable storage medium such as hard disk drive used to hold application programs, an operating system, and user data. A DID resolver API 166 is stored in memory 164. Under Web 5, the decentralized identifiers (or DIDs) are self-generated and self-owned. The DID resolver functions provided by the DID resolver API 166 are used to locate DID documents associated with DIDs in an associated distributed ledger (e.g., a blockchain). The DID resolver server 160 operates according to the Web 5 model.

Figure 2:
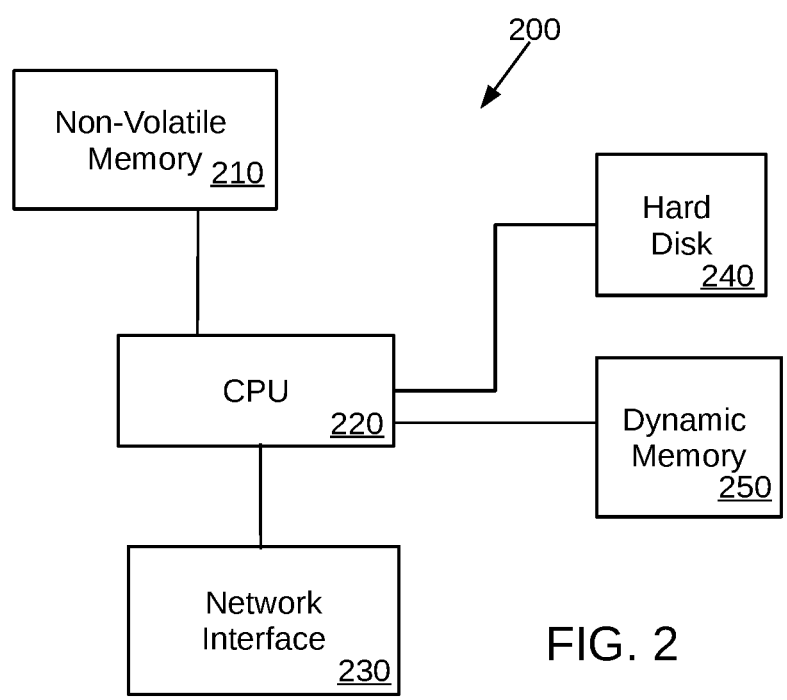
FIG. 2 is a block diagram of a server system for hosting an application program interface according to the present disclosure.

Each server and device discussed with respect to FIG. 1 may correspond to or include a similar topology as server 200 shown in FIG. 2. Server 200 is preferably a hardware-based computing system which includes one or more central processing units 220, a network interface 230, at least one hard disk (HD) 240, volatile memory 250, and non-volatile memory 210. The non-volatile memory 210 may include a basic input/output system (BIOS) used to initiate a boot of the server 200. The HD 240 may be any type of non-volatile memory device (i.e., a non-transitory computer-readable storage medium) used to hold an operating system for a computer-based system (and application programs including APIs) and the term "hard disk" as used herein is intended to be broadly defined to include both electro-mechanical data storage devices and solid-state drives. The HD 240 holds the programs (software applications) which load into volatile memory 250 upon boot of the operating system to provide the functionality of such programs, including the one or more of the APIs discussed herein. It is to be noted that the components are shown schematically in greatly simplified form, with only those components relevant to understanding of the embodiments being illustrated. The various components (that are identified in the FIG. 2) are illustrated and the arrangement of the components is presented for purposes of illustration only. It is to be noted that other arrangements with more or less components are possible without departing from the teachings of the system and method presented herein. In one presently preferred embodiment, server 200 comprises a computing system adapted to run a secure version of the Microsoft Windows® operating system or a secure Linux distribution.

The system and method of the present invention provides an open, decentralized financial system that allows banking transactions to occur globally, securely, and at significantly lower cost than traditional financial systems.

Decentralized identifiers (DIDs) are an identifier defined under Web 5 that enable verifiable, decentralized digital identity. A DID may refer to any subject determined by the controller of the DID. DIDs are decoupled from centralized registries, identity providers, and certificate authorities. Under Web 5, the owner of a DID may prove control over it without requiring permission from any other party. DIDs are uniform resource identifiers (URIs) that associate a DID subject with a DID document, allowing trustworthy interactions associated with that subject. DID documents are a metadata file that contains two primary data elements, cryptographic material that the DID owner may use to prove control over the associated DID (i.e., public keys and digital signatures), and routing endpoints for locations where one may be able to contact or exchange data with the DID owner (e.g., a decentralized web node that acts as a personal data storage and relay node). Verifiable credentials (VCs) provide a standard way to express credentials across the digital world in a way that is cryptographically secure, privacy respecting, and machine verifiable.

Decentralized web nodes are a data storage and message relay mechanism entities can use to locate public or permissioned private data related to a given DID. Decentralized web nodes have a mesh-like datastore construction that enable an owning entity to secure, manage, and transact their data with others without reliance on location or provider-specific infrastructure, interfaces, or routing mechanisms.

An issuer is the source of a VC. Both organizations and individuals (by means of their wallet) can be an issuer. Wallets act as agents for individuals or institutions by facilitating exchanges with PFIs. More specifically, a wallet provides secure encrypted storage for VCs, PFI discovery by crawling decentralized web nodes, receiving, offering, and presenting VCs, applying digital signatures, and storing transaction history. Wallet developers provide features and functionality that yield a desired user experience. Wallets typically include portability to allow seamlessly movement of credentials to another wallet and operate on a consent basis, always requesting consent before presenting VCs to other parties.

Participating Financial Institutions (PFIs) are entities that offer lending services in the system. Each PFI is identified via DIDs and VCs. PFIs can be, but are not limited to, fintech companies, regional banks, large institutional banks, or other financial institutions. While PFIs may be subject to varying rules and regulations for fiat currency payments, depending on their specific jurisdiction, they will need to collect some personally identifiable information (PII) from the owners of wallets in order to meet regulatory requirements. No PII is included in the user's ASK itself, only a description of the type of PII that can be provided should the PFI choose to accept the ASK. When a PFI receives an ASK from a wallet, it will decide if it wants to offer a bid based on the details of the ASK. PFIs will run decentralized web nodes that facilitate the reception of ASKs and transmission of BIDs. These PFI decentralized web nodes are similar to wallets and will rely on the same underlying structure.

The core messaging has two aspects, a first part in which a wallet broadcasts an ASK defining a request for a financial transaction (e.g., a loan based on digital currency collateral) and a second part in which point-to-point secure communications occur between the wallet and a PFI in which the data necessary to negotiate and execute a proposed loan transaction is exchanged.

For wallets to initiate loan transaction requests, the existence of the potential PFI counterparty DIDs must be known. A list of potential PFI counterparty DIDs may be obtained in various ways. A wallet provider may provide such a list. Individuals identify entities for inclusion on their lists of desired counterparties on their own. The wallet may include functionality to crawl a wider DID directory space to identify potential PFI counterparty DIDs.

In order to conduct the loan transaction processing of the system and method of the present disclosure, the users (wallet owners) and the PFIs must possess DIDs and must have decentralized web nodes linked to their DIDs. In addition, the users must be able to, via their wallets, identify possible counterparty PFIs. Finally, the users must be able to acquire any VCs that PFIs are likely to request as part of the process. This functionality is built into the wallet functions provided via the user app 118, for example.

Figure 3:
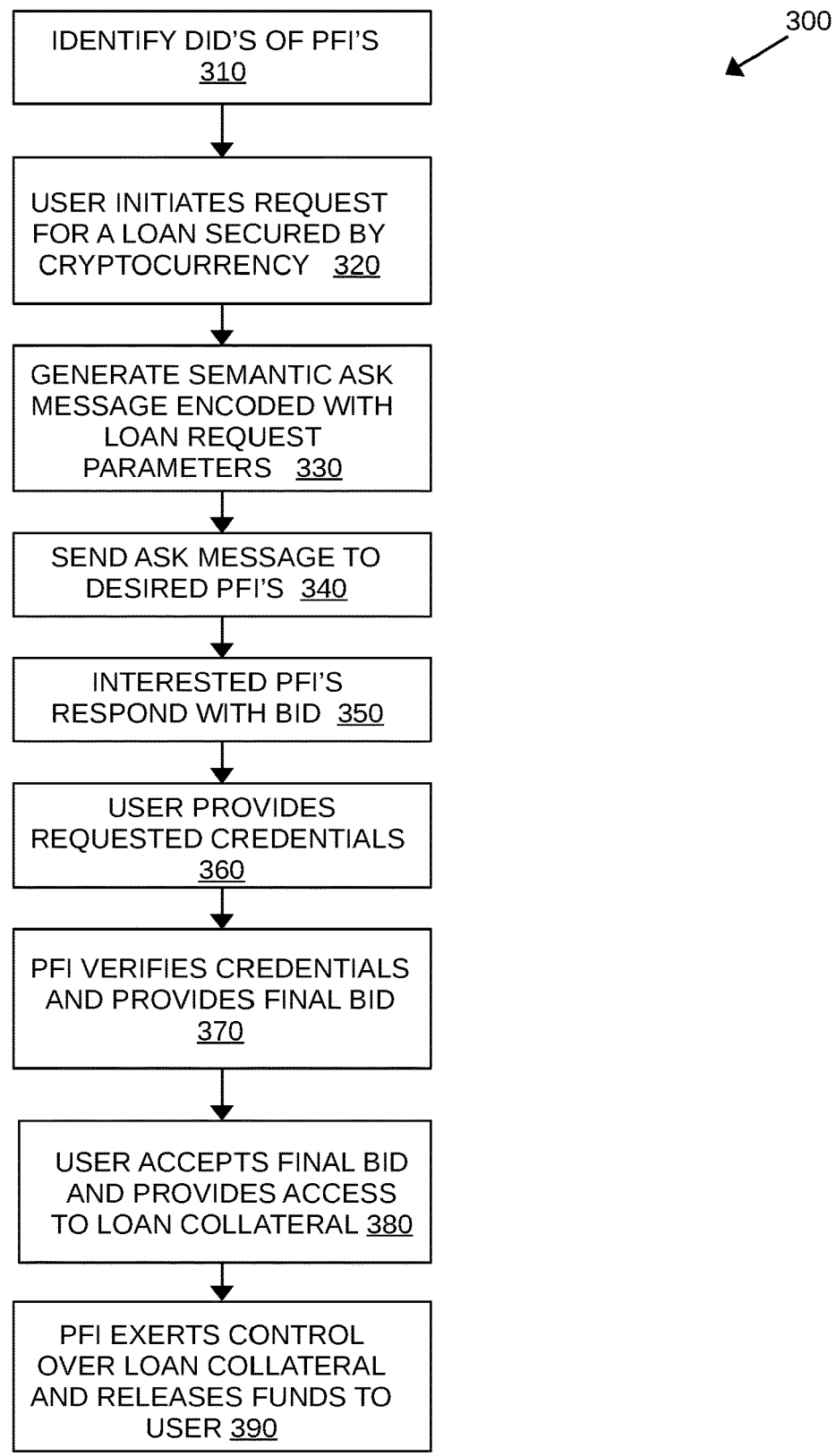
FIG. 3 is a flowchart of a first aspect of a method for providing a decentralized exchange for credit lending according to the present disclosure.

Referring now to the flowchart 300 of FIG. 3, a method for a decentralized loan transaction is described. First, the self-sovereign identity wallet identifies the DIDs of PFIs available to make loan transactions, as described above, at step 310. Next, a user initiates a request for a loan secured by an amount of cryptocurrency at step 320. This is preferably done via user app 118. The user app 118 generates a semantic ASK message that is encoded with the loan request parameters (e.g., amount of loan and amount of digital currency collateral) at step 330. The user app 118 then forwards the ASK to some or all of the available PFIs, via the associated DID, at step 340. The ASK is received at the decentralized web node of the associated PFI for all of the PFIs, and processed/evaluated by the PFI. Any interested PFI will respond with a BID at step 350. The BID will provide proposed loan terms and specify the information required from the user to respond to the bid. The user will then select a BID among the various BIDS received and provide the requested credentials (VC) to the PFI associated with the selected BID at step 360. The PFI will verify the credentials and provide a final BID to the user at step 370. In some cases, the credentials may include a trust score calculated via the method of flowchart 500. The user may elect to accept the final BID and provide the PFI with access to the loan collateral at step 380. This access is preferably via a locking-scripting/multi-signature locking mechanism which provides a consumer with partial self-custody of their collateral. Once the PFI has a level of control over the loan collateral (e.g., digital currency such as bitcoin), the PFI releases the loan funds in fiat money to the user at step 390.

The method of the flowchart 300 explains how a consumer can conduct a loan transaction that is secured via a digital currency using the system and method of the present disclosure. In a further embodiment, additional types of transactions may also be conducted. A PFI may submit a BID for selling a secured loan to another PFI or offer terms to consumers. A consumer can transfer their loan position to another consumer.

Figure 4:
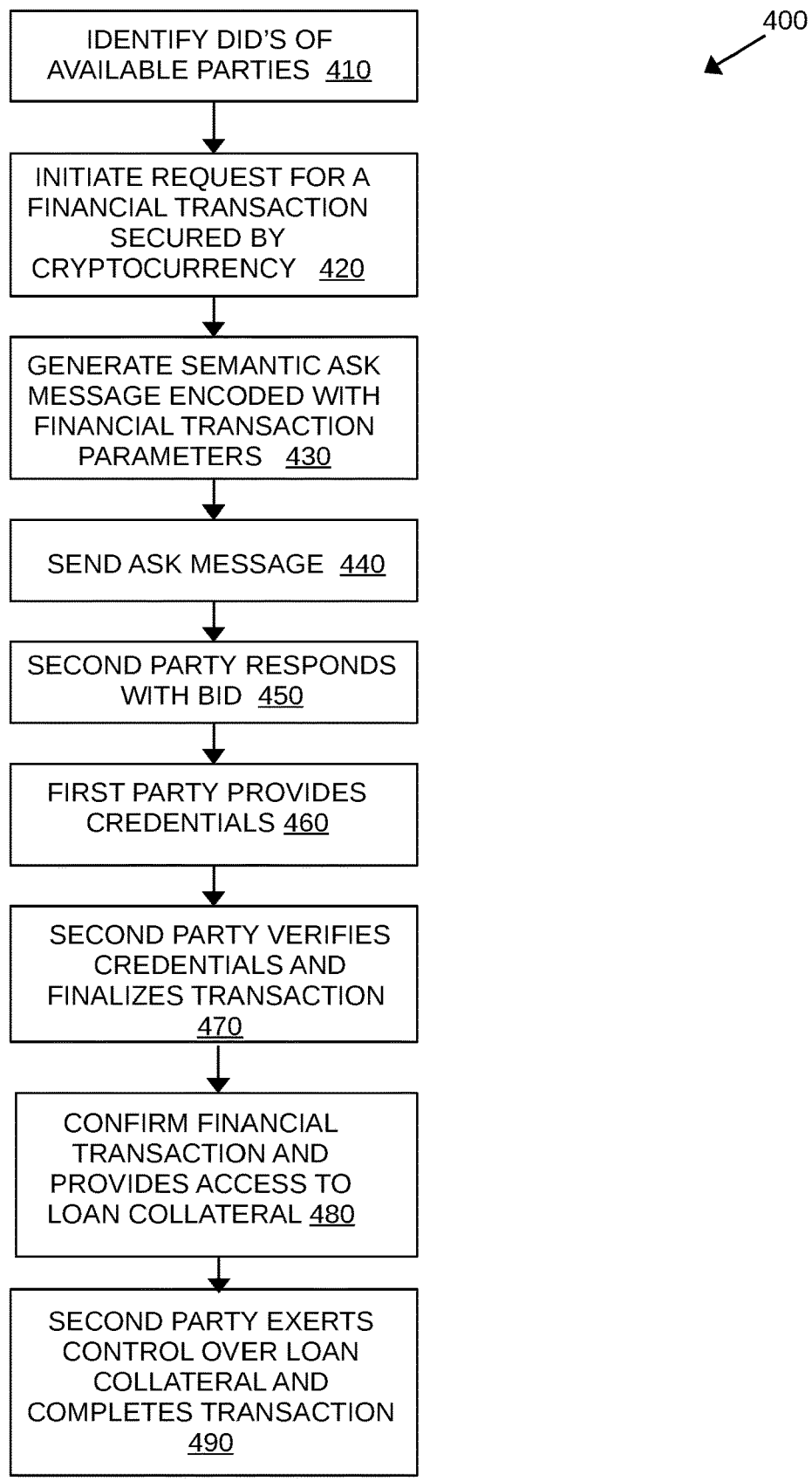
FIG. 4 is a flowchart of a second aspect of a method for providing a decentralized exchange for credit lending according to the present disclosure.

Referring now to FIG. 4, a flowchart 400 is shown of a method that addresses financial transactions between two parties, a first party and a second party. The first party may be a consumer or a PFI that initiates a transaction request and the second party may be a consumer or a PFI that responds to the transaction request. First, the DIDs of parties available for financial transactions are identified, at step 410. This can be done in a similar manner as in the method of flowchart 300, but with a broader reach to both PFIs and willing consumers. Next, a first party initiates a request for a financial transaction at step 420. This is preferably done via the user app 118 when the first party is a consumer or via the PFI app 128 (or 138, 148) when the first party is a PFI. The user app 118 (or, e.g., PFI app 128) generates a semantic ASK message that is encoded with the loan request parameters (e.g., amount of loan and amount of cryptocurrency collateral) at step 430. The user app 118 (or, e.g., PFI app 128) then forwards the ASK to some or all of the available parties (PFIs or consumers or both), via an associated DID, at step 440. The ASK is received at the decentralized web node of the associated PFI or consumer for all of the PFIs and consumers, and processed/evaluated by the PFI and/or consumer. Any interested PFI or consumer will respond with a BID at step 450. The BID will provide proposed terms for the particular financial transaction and specify the information required from the user to respond to the bid. The first party will then select a BID among the various BIDS received and provide the requested credentials (VC) to the PFI or consumer (the second party) associated with the selected BID at step 460. The second party will verify the credentials and provide a final BID to the first party at step 470. In some cases, the credentials may include a trust score calculated via the method of flowchart 500. The first party may elect to accept the final BID and provide the second party with access to the loan collateral at step 480. This access is preferably via a locking-scripting/multi-signature locking mechanism which provides a consumer with partial self-custody of their collateral. Once the second party has a level of control over the loan collateral (e.g., cryptocurrency such as bitcoin), the second party completes the financial transaction at step 490.

Figure 5:
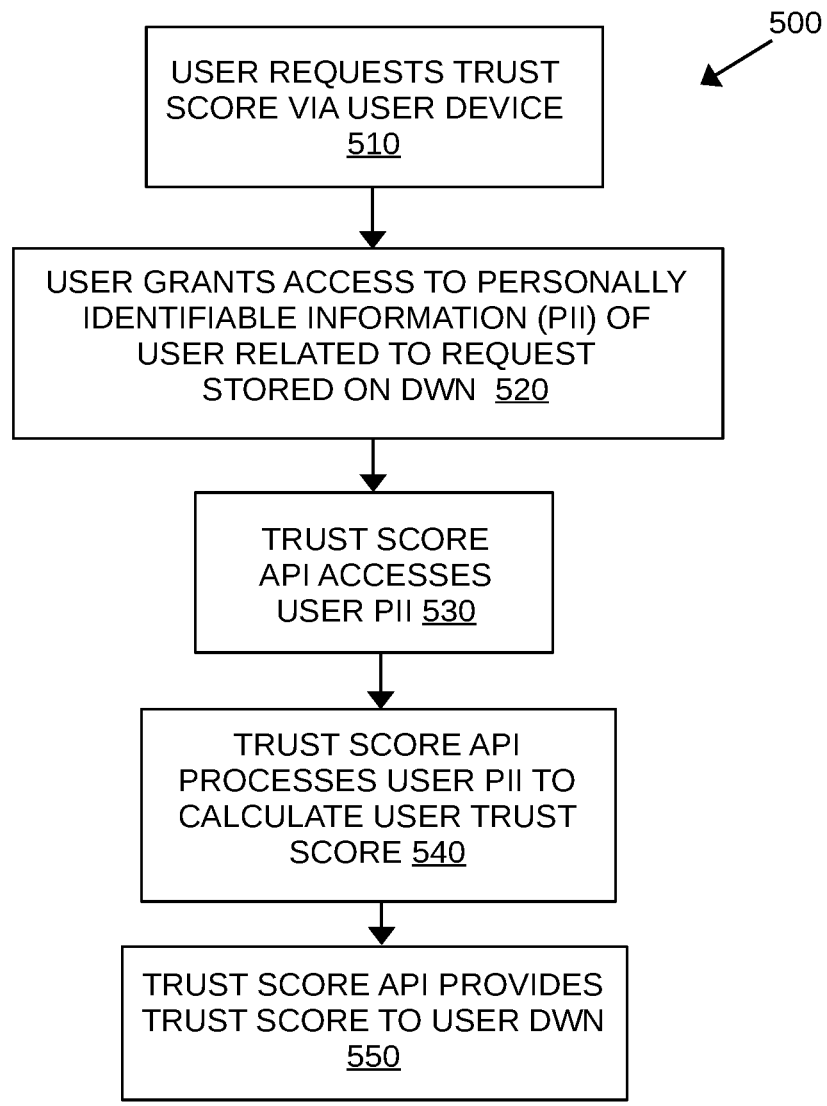
FIG. 5 is a flowchart of a method for use in generating a self-sovereign identity-based user trust score for use with the system and method of the present disclosure.

Referring now to the flowchart 500 of FIG. 5, in operation, a user may request a trust score for lending purposes at step 510. The user may respond to a lending offer provided via an email, a text message, a website, or provider app. Alternatively, the user app 118 may provide the user with the ability to request the trust score. The user next grants access to personally identifiable information of the user stored in the user's decentralized web node at step 520. In some cases, the user may have both a local and remote decentralized web node, but for ease of understanding the remote node is not shown in FIG. 1. Typically, this grant will be limited to only that part of the personally identifiable information that is relevant to establishing the user's credit worthiness. The trust score API next accesses the user's personally identifiable information at step 530 and processes the accessed information to calculate a trust score at step 540. The user's personally identifiable information is preferably received in encrypted form at the trust score API and is erased once the trust score is calculated. In an alternative embodiment, the user's personally identifiable information is analyzed via homomorphic encryption in order to better safeguard that information. The value of the trust score may be calculated based on income, assets, and payment history in a manner similar to a conventional credit score. Once the trust score is calculated, it is provided to the user at step 550 for storage in the user's decentralized web node. The trust score is preferably formatted as a verifiable credential of the user.

Web 5 provides a new identity layer for the Web to enable decentralized apps and protocols that is intended to empower individuals with self-owned identity and control over their personally identifiable information. The trust score of the present disclosure is a data profile that is based on some or all the following data about the user: state-issued identity docs, in-store/online purchase history, bill pay history, address, phone, email, debt payment history, mortgage activity, credit card activity, loan activity, income, pay stubs, etc. The trust score can be based on any information that can be leveraged to properly assess a consumer's worthiness for trust in context.

The system and method of the present disclosure provides an entirely new system of managing identify information based on Web 5 constructs including Decentralized Web Nodes (DWNs) and Self-Sovereign Identity (SSI) Verifiable Credentials (VCs). Consumers using the system and method of the present disclosure will be assured that no copies of their personal identifiable information will exist anywhere in random servers throughout the internet based on the use of this system.

Although the present disclosure has been particularly shown and described with reference to the preferred embodiments and various aspects thereof, it will be appreciated by those of ordinary skill in the art that various changes and modifications may be made without departing from the spirit and scope of the disclosure. It is intended that the appended claims be interpreted as including the embodiments described herein, the alternatives mentioned above, and all equivalents thereto.

What is claimed is:

1. A method of performing a financial transaction, comprising:

requesting, via a first application running on a first server, a financial transaction secured by collateral of a first party in a form of digital currency;

generating, by the first application running on the first server, a semantic loan request ("semantic ASK") message encoded with parameters defining the requested financial transaction and an identification of personally identifiable information available for the first party;

identifying, by the first application running on the first server, a second party via a decentralized identifier associated with the second party, wherein the decentralized identifier associated with the second party is obtained via a decentralized identifier resolver application programming interface running on an associated processor of a decentralized identifier resolver server;

sending, by the first application running on the first server, the semantic ASK message to a decentralized web node of the second party, wherein the decentralized web node of the second party is identified via the decentralized identifier associated with the second party;

receiving, by the first application running on the first server, a BID message from the second party defining proposed terms for the requested financial transaction and specifying information required from the first party for responding to the BID message;

providing, by the first application running on the first server, a second application running on a separate remote server with access to personally identifiable information of the first party including income, assets, and/or payment history stored in encrypted form on a decentralized web node of the first party, wherein the decentralized web node of the first party is identified by a decentralized identifier associated with the first party;

generating, by the second application running on the separate remote server, a trust score based on the personally identifiable information of the first party, the trust score formatted as a verifiable credential of the first party;

transmitting, by the second application running on the separate remote server, the generated trust score to the decentralized web node of the first party;

forwarding to the second party, by the first application running on the first server, credentials for the first party from the decentralized web node of the first party, wherein the credentials comprise the information required from the first party for responding to defined in the BID message and the trust score; and providing, by the first application running on the first server, access to the collateral of the first party to the second party upon receipt of confirmation of the financial transaction from the second party.

2. The method of claim 1, wherein the financial transaction is a loan of fiat money.

3. The method of claim 1, wherein the decentralized web node of the first party is provided via a decentralized web node application programming interface running on a processor at a server associated with the first party.

4. The method of claim 1, wherein the decentralized identifier associated with the first party is obtained via the decentralized identifier resolver application programming interface running on the associated processor of the decentralized identifier resolver server.

5. The method of claim 1, wherein the decentralized web node of the second party is provided via a decentralized web node application programming interface running on a processor at a server associated with the second party.

6. The method of claim 1, wherein the first party is a consumer.

7. The method of claim 1, wherein the second party is a participating financial institution.

8. A system for performing a financial transaction, comprising:

a remote server having an associated processor and an associated non-transitory computer-readable storage medium, the associated non-transitory computer-readable storage medium having executable instructions for an associated application, which when executed, cause the associated processor to perform the following operations:

receiving access to personally identifiable information of a first party including income, assets, and/or payment history stored in encrypted form on a decentralized web node of the first party, wherein the decentralized web node of the first party is identified by a decentralized identifier associated with the first party;

generating a trust score based on the personally identifiable information of the first party, the trust score formatted as a verifiable credential of the first party; and transmitting the generated trust score to the decentralized web node of the first party;

a first server having an associated processor and an associated non-transitory computer-readable storage medium, the associated non-transitory computer-readable storage medium having executable instructions for an associated application, which when executed, cause the associated processor to perform the following operations:

requesting a financial transaction secured by collateral of the first party in a form of digital currency;

generating a semantic loan request ("semantic ASK") message encoded with parameters defining the requested financial transaction and an identification of personally identifiable information available for the first party;

identifying a second party via a decentralized identifier associated with the second party, wherein the decentralized identifier associated with the second party is obtained via a decentralized identifier resolver application programming interface running on an associated processor of a decentralized identifier resolver server;

sending the semantic ASK message to a decentralized web node of the second party, wherein the decentralized web node of the second party is identified via the decentralized identifier associated with the second party;

receiving a BID message from the second party defining proposed terms for the requested financial transaction and specifying information required from the first party for responding to the BID message;

forwarding, to the second party, credentials for the first party from the decentralized web node of the first party, the credentials defined in the BID message, wherein the credentials comprise the information required from the first party for responding to the BID message and the trust score; and providing access to the collateral of the first party to the second party upon receipt of confirmation of the financial transaction from the second party.

9. The system of claim 8, wherein the financial transaction is a loan of fiat money.

10. The system of claim 8, wherein the decentralized web node of the first party is provided via a decentralized web node application programming interface running on a processor at a server associated with the first party.

11. The system of claim 8, wherein the decentralized identifier associated with the first party is obtained via the decentralized identifier resolver application programming interface running on the associated processor of the decentralized identifier resolver server.

12. The system of claim 8, wherein the decentralized web node of the second party is provided via a decentralized web node application programming interface running on a processor at a server associated with the second party.

13. The system of claim 8, wherein the first party is a consumer.

14. The system of claim 8, wherein the second party is a participating financial institution.

* * * * *